United States Patent [19]
LaPadula, III et al.

[11] Patent Number: 5,245,628
[45] Date of Patent: Sep. 14, 1993

[54] ENHANCED L1/L2 CODE CHANNEL FOR GLOBAL POSITIONING SYSTEM RECEIVERS

[75] Inventors: Leonard J. LaPadula, III, Carrollton; John P. Volpi, Garland, both of Tex.; Hugh L. Scott, Colorado Springs, Colo.

[73] Assignee: Texas Instruments Incorporated, Dallas, Tex.

[21] Appl. No.: 677,701

[22] Filed: Mar. 29, 1991

[51] Int. Cl.⁵ .............................................. H04L 27/30
[52] U.S. Cl. .......................................... 375/1; 380/34; 342/357
[58] Field of Search ............... 375/1; 380/34; 342/352, 342/356, 357

[56] References Cited

U.S. PATENT DOCUMENTS

| | | | |
|---|---|---|---|
| 4,468,793 | 8/1984 | Johnson et al. | 375/97 |
| 4,485,383 | 11/1984 | Maher | 342/352 |
| 4,809,005 | 2/1989 | Counselman, III | 342/352 |
| 4,821,294 | 4/1989 | Thomas, Jr. | 342/352 X |
| 4,894,662 | 1/1990 | Counselman | 342/357 |
| 4,928,106 | 5/1990 | Ashjaee et al. | 342/352 |

*Primary Examiner*—Bernarr E. Gregory
*Attorney, Agent, or Firm*—René E. Grossman; Richard L. Donaldson

[57] ABSTRACT

An enhanced P-code channel (60) for use in a GPS receiver (10) to simultaneously track L1 and L2 comprises a P-code clock generator (62) for generating two code clocks. The first code clock associates with L1 and the second associates with L2. The code clocks have the same frequency but different phases from one another. Circuitry (64) and (66) generate and store a plurality of P-code chips. A first circuit (68, 70) selects and updates P-code chips from the stored P-code chips that are in phase with the L1 code clock. A second circuit (72 and 74) selects and updates P-code chips from the P-code chips and phased with the L2 code clock.

31 Claims, 4 Drawing Sheets

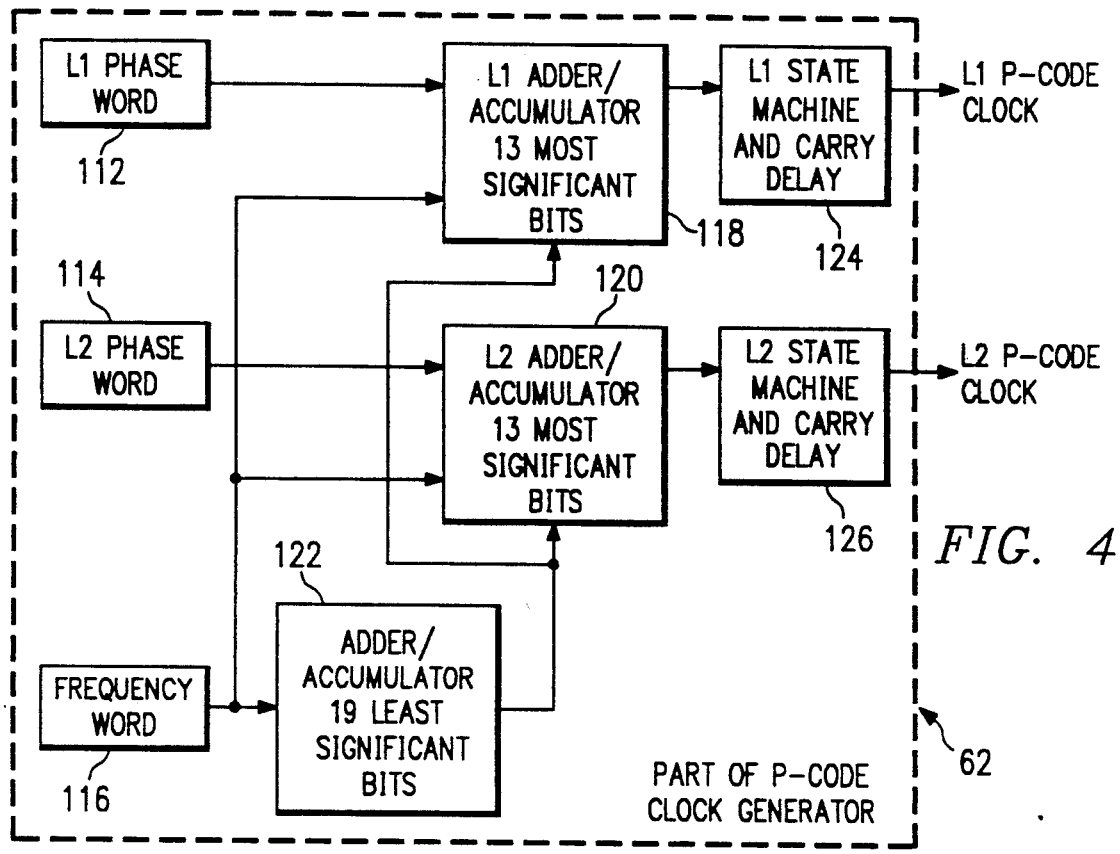

FIG. 4

FIG. 5 GATE COUNT OF PRIOR ART CHANNEL VERSUS ENHANCED L1/L2 CHANNEL

| FUNCTION | TYPICAL QTY | TYPICAL GATES | ENHANCED QTY | ENHANCED GATES |
|---|---|---|---|---|
| CARRIER GENERATOR 36,80,82 | 1 | 1244 | 2 | 2488 |
| CARRIER MIXER 38,84,86 | 1 | 126 | 2 | 252 |
| P-CODE CLOCK GEN. 40,62 | 1 | 1246 | 1.5 | 1869 |
| P-CODE GENERATOR 42,64 | 1 | 3000 | 1 | 3000 |
| CIRCULAR BUFFER 66 | 0 | 0 | 1 | 150 |
| COUNTER 68,72 | 0 | 0 | 2 | 60 |
| 16:1 MULTIPLEXER 70,74 | 0 | 0 | 2 | 66 |
| P-CODE DELAY SHIFT REG. 48,76,78 | 1 | 25 | 2 | 50 |
| P-CODE MIXERS 52,90,92 | 3 | 9 | 6 | 18 |
| C/A-CODE CLOCK GEN. 44 | 1 | 50 | 1 | 50 |
| C/A-CODE GEN. 46 | 1 | 500 | 1 | 500 |
| C/A-CODE DELAY SHIFT REG. 50,88 | 1 | 50 | 1 | 75 |
| C/A-CODE MIXERS 54,94 | 6 | 18 | 9 | 27 |
| CORRELATOR SWITCH 58,98,100 | 3 | 9 | 6 | 18 |
| INTEGRATORS 56,96 | 6 | 4100 | 9 | 6150 |
| TOTAL | | 10,377 | | 14,773 |

ENHANCED L1/L2 CODE CHANNEL FOR GLOBAL POSITIONING SYSTEM RECEIVERS

TECHNICAL FIELD OF THE INVENTION

This invention relates to Global Positioning System (GPS) receivers and more particularly a method for enhancing a single receiver channel for processing a plurality of L-band signals.

BACKGROUND OF THE INVENTION

The NAVSTAR Global Positioning System (GPS) is used to determine exact geographic position (i.e. latitude, longitude, and height above the earth) as well as the exact velocity and time of stationary or moving objects. The navigation receiver calculates position, and time by determining distance to a series of satellites. The navigation receiver calculates velocity by determining doppler frequency shift of the satellite signals.

The NAVSTAR GPS receiver must receive signals generated from the satellite about 11,000 miles away. Each GPS satellite transmits a 6-watt signal. The satellite and receiver, therefore, employs spread spectrum techniques to differentiate the signal from the noise. This is essential since at the antenna the GPS signal is typically about 20 dB below ambient cosmic noise. "Spread spectrum" means that the frequency or instantaneous phase of the signal being transmitted changes as a function of time. Using spread spectrum signal processing techniques, the receiver can track the spread spectrum signal coming from the satellite by estimating a duplicate image of the signal. A precise match of the satellite's spread spectrum signal produces a potential signal processing gain of up to 53 decibels.

Each satellite generates two spread spectrum signals centered around separate frequencies. The L1 channel is centered about 1575.42 MHz, and has course/acquisition-(C/A-) code and precision- (P-) code modulated on it. C/A-code has a 1.023 MHz chipping rate with a band width of about 2 MHz, and P-code has a 10.23 MHz chipping rate with a bandwidth of about 20 MHz. The L2 channel is centered around 1227.6 MHz and only has P-code modulated on it.

For some applications it is desirable to track both L1 and L2. A position can be derived from just the C/A-code or P-code on the L1 band. However, there is ionospheric delay that unpredictably affects the perceived range to the satellite from the receiver. These errors can be corrected by tracking both L1 and L2 and by measuring the difference in the range that is perceived by the receiver on these L-bands. In this manner, the ionospheric errors can be reduced and the navigation solution can be made more accurate by a few meters. In addition, tracking both L bands simultaneously provides more anti-jamming immunity for operation in hostile environments.

The easiest way to track L1 and L2 is with an independent tracking loop for each channel. In all implementations to date, either a single channel is multiplexed between L1 and L2 to reduce hardware requirements or an additional complete hardware channel is provided. This either compromises performance and increases software complexity or increases hardware. In either case, this capability adds significant cost to the receiver.

For some operational scenarios, it may also be desirable to be able to switch between having two independent tracking loops and having one tracking loop with a phase delta between L1 and L2. Two independent loops will be used in hostile environments where there is a good possibility of losing either L1 or L2.

As an example of the problem, consider the situation of navigating above 80° latitude north. Above 80° latitude, the Northern Lights and sun spot activity in the north pole make the ionosphere so active that there is the need for frequent L1 and L2 calculations to maintain GPS system accuracy. Using present systems, performing these frequent L1 and L2 calculations makes it is necessary to add additional hardware channels to the receiver. This increases space and cost for each receiver, and increases processor throughput and software complexity. Computer resources to support the increased number of hardware channels forces the user to make some performance compromises. If a system existed that can track L1 and L2 without the penalty of additional hardware, increased computer throughput and increased software complexity it would have value for the GPS user community.

In known systems, it has been necessary to use two channels to track both L1 and L2. The same P-code information is transmitted on the L1 and L2 bands. However, the receiver sees a phase shift between the two signals because of ionospheric delay. The amount of delay is a function of the level of the ionospheric influence. Therefore, if it were possible to use the fact that this information is related, then it may not be necessary to use two wholly independent channels for tracking L1 and L2.

Accordingly, a need exists in the art for a system and method of tracking both L1 and L2 in a GPS receiver without resorting to two distinct hardware channel receivers or time sharing a single channel.

A further need exists in the art for such a receiver designed in a way so as to minimize power consumption and size.

A further need exists in the art for method and system of providing a GPS receiver which allows for both single and double looped processing of L1 and L2 interchangeably. This allows for selecting between the high jamming immunity of tracking L1 and L2 independently or the processor throughput savings of tracking L1 and L2 together.

SUMMARY OF THE INVENTION

Accordingly, the present invention provides inventive subject matter which overcomes the problems associated with ionospheric delay in Global Positioning System (GPS) receivers. In particular, the present invention provides a single enhanced precision code (P-code) channel for use in a GPS receiver that can simultaneously track L1 and L2 from a single satellite.

The enhanced P-code channel includes a single P-code clock generator for generating two code clock signals (L1 and L2) with the same frequency but a different phase. A P-code generator uses one of the P-code clocks to generate a continuous P-code data stream. Circuitry then stores a plurality of the most recently generated P-code chips. A counter and multiplexer circuit is then used to maintain a constant P-code stream (which may be delayed from the output of the P-code generator) by using one of the P-code clocks. In addition, carrier generation and mixing circuitry, code delay shift registers and mixing circuitry, and multiple predetection accumulators exist to allow for the simultaneous tracking of L1 and L2 signals.

A technical advantage of the present system is that, by enhancing a single P-code channel, it is possible to obtain the benefit of independent L1 and L2 tracking loops within a GPS system without the penalty of having two independent hardware channels for this purpose.

Another technical advantage of the present invention is that it is possible to gain the benefit of tracking L2 in addition to L1 to reduce error introduced by ionospheric delay, without the additional processor throughput requirements of tracking L2 independently.

Yet another technical advantage of the present invention is that it permits making continual L1 and L2 calculations without the need for additional computing and support equipment.

BRIEF DESCRIPTION OF THE DRAWINGS

A more complete understanding of the present invention may be acquired by referring to the detailed description and claims when considered in connection with the accompanying drawings in which like reference numerals indicate like features wherein:

FIG. 4 is a block diagram representing the P-code clock generator according to a preferred embodiment of the present invention;

FIG. 5 provides a comparison chart between a typical and enhanced P-code channel for tracking L1 and L2 of the present invention.

DETAILED DESCRIPTION OF THE INVENTION

The preferred embodiment of the present invention is best understood by referring to the FIGUREs wherein like numbers are used for like corresponding parts of the various components.

Figure 1:
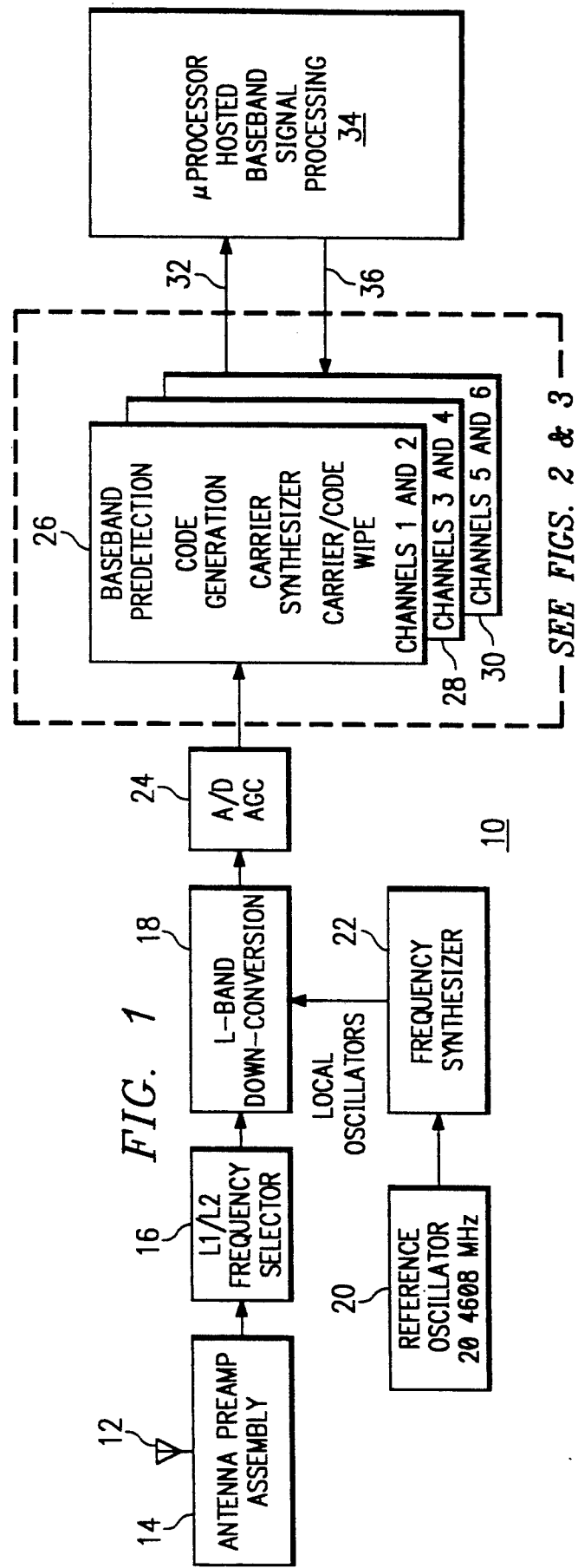
FIG. 1 is a block diagram of a GPS receiver that may use the enhanced L1/L2 channel of the present invention.

To understand the present invention, it is best to understand the environment of the preferred embodiment. For this purpose, FIG. 1 provides a simple block diagram of a Global Positioning System (GPS) navigation receiver. The system of FIG. 1 is described in more detail in U.S. patent application Ser. No. 07/662,585, filed Feb. 28, 1991 to John P. Volpi et al and assigned to Texas Instruments Incorporated entitled "System and Method for Digital Navigation Satellite Receiver", now abandoned and U.S. patent application Ser. No. 07/663,968, filed Feb. 28, 1991 to L. J. Lapadukal Leonard LaPadula III, et al, also assigned to Texas Instruments Incorporated, entitled "Method and System for Multi-Channel and Search Global Position System Signal Processor" both filed on Feb. 28, 1991, and are hereby expressly incorporated by reference in their entirety.

FIG. 1 is a simple block diagram of the whole receiver. A single RF path amplifies and down-converts the L1 or L2 signal to an intermediate frequency (IF). The receiver performs analog-to-digital conversion before any GPS signal processing takes place. After the signal is digitized, the signal is processed in three signal processing chips (SPC). The SPCs perform all the GPS hardware signal processing.

Referring more particularly to FIG. 1, there is shown receiver 10 which utilizes antenna 12 feeding into preamp assembly 14. Antenna preamp assembly 14 feeds into L1/L2 frequency selector 16 which sends signals to L-band down conversion 18. These components all operate under the control of reference oscillator 20 and frequency synthesizer 22. Reference oscillator 20 and frequency synthesizer 22 provide oscillation for L-band down conversion 18. Output from L-band down conversion 18 is a second IF that goes into an analog-to-digital converter (A/D) with automatic gain control (AGC) circuit 24. The output of this A/D circuit is then channelized to code and carrier wipe off in circuits 26, 28 and 30. This is where the remote signal transmitted by the GPS satellite is compared and matched with the receiver's estimate of the remote signal.

The outputs of signal processing circuits, 26, 28 and 30 are shown as signals 32 into processor computer 34. Processor computer 34 provides signals 36 to signal processing circuit 26, 28 and 30 to direct the circuits to change their code and carrier estimates, as well as for general control of the circuits.

Each signal processing circuit 26, 28 and 30, uniquely and completely generates carrier estimates, code estimates, base band pre-detection estimates and contains all the correlators for signal processing as well as provides autonomous signal search capability for two satellites. Each channel also has the capability to simultaneously track both the C/A-code and P-code. Where ever used herein, the term P-code shall include P(Y)-code.

Figure 2:
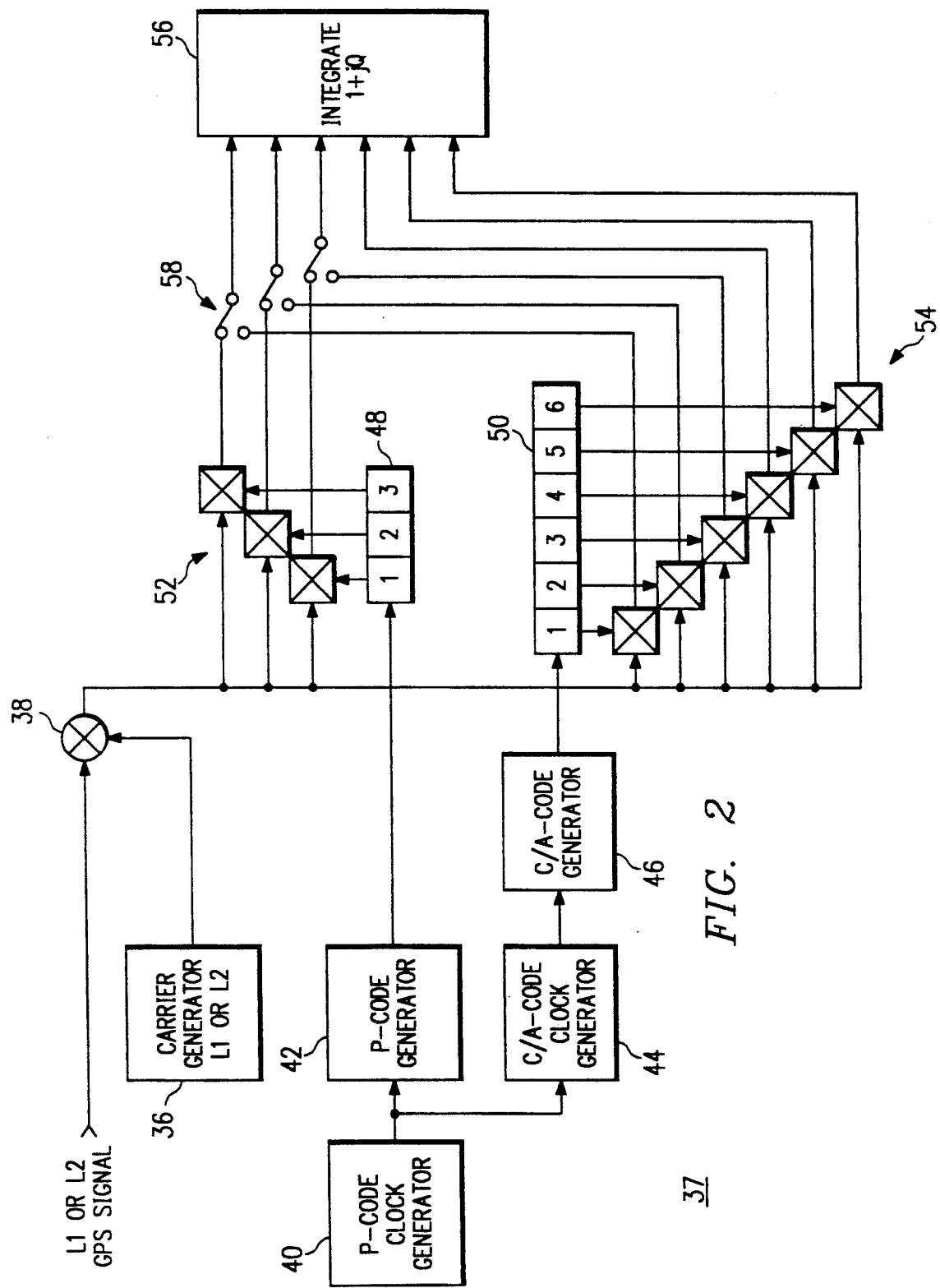
FIG. 2 is a block digram of a typical C/A- and P-code channel for use in a GPS receiver for receiving L1 and L2.

FIG. 2 shows now a typical method to perform pre-detection integration in single C/A- and P-code channel 37. This channel 20 can only track L1 C/A- and P-code or L2 P-code. Carrier generator 36 generates a complex estimate of the incoming GPS carrier. Carrier mixer 38 wipes off the incoming carrier. P-code clock generator 40 and P-code generator 42 generate an estimate of P-code and C/A- code clock generator 44 and C/A-code generator 46 generate an estimate of the C/A-code. P-code delay shift register 48 and C/A-code delay shift register 50 generate a plurality of P-code and C/A-code phases ½-chip apart, respectively. Finally, code is wiped off in P-code mixers 52 and C/A-code mixers 54. Pre-detection integration is then, performed using an integrate circuit 56.

Six correlators are shown so the P-code and C/A-code can be tracked simultaneously (three for P-code and three for C/A-code). In addition it is possible to dedicate all six correlators to C/A-code using correlator switches 58 for search modes of operation. This is done so that C/A-code can be found more quickly in typical search operations.

For some applications of GPS, it is desirable to be able to track L1 and L2 simultaneously. Hardware aside, the easiest way to do this is with an independent tracking loop for L1 and L2. By enhancing the previously described channel 37, it is possible to get the benefit of independent L1 and L2 tracking without the penalty of having two independent channels. For some operational scenarios, it also may be desirable to be able to switch between having two independent tracking loops and having one tracking loop with a phase delta between L1 and L2. Two independent loops would be used in hostile environments where there is a good possibility of losing either L1 or L2. One tracking loop may be desirable for less processor throughout when there is no threat of losing the main L-band. Within a P-code receiver such as that of FIG. 1, the present invention allows this operational flexibility. For these purposes, FIG. 3 describes an enhanced single P-code L1/L2 channel that may be used to enhance the capability of signal processing circuits 26, 28 and 30.

Figure 3:
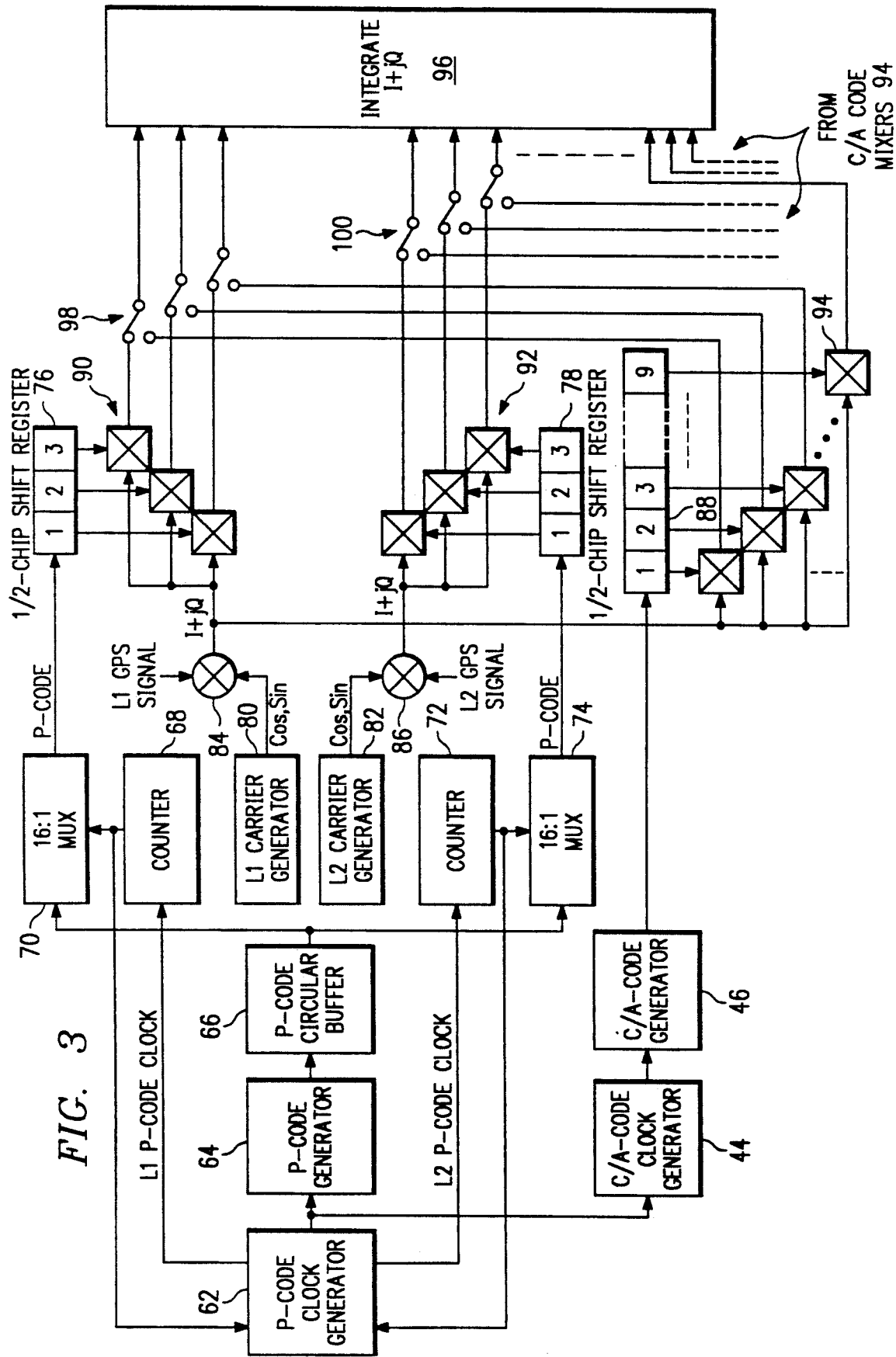
FIG. 3 is a block diagram of a preferred embodiment of the enhanced P-code channel for tracking L1 and L2 for GPS applications.

FIG. 3 shows an enhanced L1/L2 channel 60 according to the present invention. The modified P-code clock generator 62 generates two P-code clocks with same frequency and independent phase, one for L1 and one for L2. The modified P-code clock generator 62 also detects which of these clock lead. The leading clock is used to clock P-code generator 64. Each new P-code chip is stored in the next location of the P-code circular buffer 302. P-code clock generator 62 is used to increment the L1 and L2 P-code chip counters 68 and 70, respectively. Whenever the L1 P-code chip counter, 68, is incremented, 16-to-1 MUX 70 passes the next P-code chip stored in the P-code circular buffer 66 to the L1 P-code delay shift register 76. The L2 P-code chip counter 72 and 16-to-1 MUX 74 are implemented and work in exactly the same manner as the L1 P-code chip counter 68 and 16-to-1 MUX, 70. Thus, from one P-code generator 64 two P-code outputs, one for L1 and one for L2, go to code delay shift registers, 76 and 78, respectively. This represents a considerable savings in circuitry because P-code generator 64 comprises numerous gates and additionally requires significant computer processing capability to support its operation. Although the preferred embodiment requires a separate carrier generator for each signal frequency, carrier generators for L1 and L2 are easy to build and do not consume nearly as much power as would a second complete channel.

The enhanced L1/L2 channel 60 of FIG. 3 provides maximum operational flexibility with minimal additional circuitry. Circuits which are not changed from the previously described typical C/A- and P-code channel include the P-code generator 64, C/A-code clock generator 44, and C/A-code generator 46. The carrier generators, 80 and 82, and carrier mixers, 84 and 86 are the same as the previously shown carrier generator 36 and carrier mixer 38, except that L1 carrier generator 80 is always configured to generate an L1 carrier and the L2 carrier generator 82 is always configured to generate an L2 carrier. Also, the code delay shift registers, 76,78 and 88, code mixers, 90, 92 and 94, the pre-detection integration circuitry 96, and correlator switches 98 and 100 are implemented and function such as the code delay shift registers 48 and 50, coder mixers, 52 and 54, the pre-detection integration circuitry 56 and the correlator switches 58 shown in the typical C/A- and P-code channel 37 of FIG. 2. The only difference being that there is an extra set of P-code delay shift registers 78, P-code mixers 92 and correlator switches 100 and that the pre-detection integration circuitry 332 supports three additional correlators. This is done to accommodate the extra three correlators required to track L2 P-code.

Unique to the enhanced channel is a modified P-code clock generator 62, a P-code circular buffer 66, two P-code chip counters, 68 and 72, and two 16-to-1 multiplexers (MUX), 70 and 74.

FIG. 4 shows a high level block diagram of the modified P-code clock generator 62. This circuit is a unique modification of the low-powered digital oscillator detailed in co-pending application entitled "Method and Systems for a Multi-Channel Global Position System Signal Processor". Circuitry to determine which clock leads is not shown. One approach to determine the leading clock is to extend the P-code chip counters 68 and 74 an extra two bits and compare the counter values to see which clock leads.

The circuit operation of the modified P-code clock generator 62, is basically the same as the code clock generator described in the previously mentioned co-pending U.S. Patent Applications. The modification is that there are two separate 16-bit P-code clock phase words 112 and 114, one for determining the phase of the L1 P-code clock and the other for determining the phase of the L2 P-code clock. Since initial P-code clock phase only affects the 13 most significant bits of the 32-bit P-code clock generator adder/accumulator, the 19 least significant bits of the adder/accumulator 122 are common to both the L1 and the L2 P-code clock. The frequency word 116 is also common to both the L1 and L2 P-code clock. Along with the two separate P-code clock phase words, 112 and 114 are two 13-bit adder/accumulators 118 and 120 one for L1 P-code clock and one for L2 P-code clock, which together with the 19-bit adder/accumulator 122 make up two separate 32-bit adder/accumulators capable of generating carriers to the two state machines 124 and 126 with the same frequency but different phase. The state machine and carry delay circuits 124 and 126 are exactly the same as described in the previously mentioned co-pending U.S. Patent Applications.

FIG. 5 shows the estimated difference between a typical single L-band channel and the enhanced L1/L2 channel of the present invention. An enhanced channel requires only 42% additional circuitry over a normal channel and provides the performance benefit and software reduction of two completely independent channels for tracking L1 and L2 simultaneously.

The cost of the enhanced channel is considerably less than the 42% when overhead circuitry such as channel timing and control, processor interface and search specific circuits are included in the gate count estimates. Also note that for this specific example, that the enhanced channel has three additional correlators. This provides approximately a 50% improvement in search speed. As a result of the enhanced P-code channel of the present invention, there is provided an apparatus and method for significantly increasing GPS system receiver channel flexibility without a significant increase in circuitry or software complexity.

Although this description describes the invention with reference to the above specific embodiments, the claims, and not this description, limit the scope of the invention. Various modifications or the disclosed embodiment, as well as alternative embodiments of the invention, will become apparent to persons skilled in the art upon reference to the above description. Therefore, the appended claims will cover such modification that follow up in the true scope of the invention.

What is claimed is:

1. A P-code channel used in a GPS receiver for simultaneously tracking spread spectrum signals transmitted from a plurality of GPS satellites over L1 and L2 frequency bands comprising:

a P-code clock generator for generating a first and a second clock signal, said first clock signal associated with the L1 frequency band and said second clock signal associated with the L2 frequency band, said first and second clock signals having the same frequency but different phases;

circuitry coupled to said P-code clock generator for generating a plurality of P-code chips and storing a plurality of the most recently generated of said P-code chips;

a first circuit for selecting a P-code from said stored plurality of P-code chips, said selected P-code being in phase with said first clock signal; and a second circuit for selecting a P-code from said stored plurality of P-code chips, said selected P-code being in phase with said second clock signal.

2. The apparatus of claim 1 and further comprising a P-code circular buffer within said generating and storing circuitry for storing two phases of P-code to track the L1 and L2 frequency bands separately.

3. The apparatus of claim 2 wherein said channel is configured to independently track the L1 or L2 frequency bands.

4. The apparatus of claim 1 and further comprising circuit for simultaneously generating C/A-code for the L1 frequency band, P-code for the L1, and P-code for L2 frequency band.

5. The apparatus of claim 4 and further comprising circuitry for vector summing said C/A-code for L1, P-code for the L1 frequency band, and P-code for the L2 frequency band to increase sensitivity of said channel.

6. The apparatus of claim 1 and further comprising circuitry for continuous ionospheric correction within said channel.

7. A multi-channel GPS signal processor for use in a GPS receiver, said processor comprising:

digital signal processing circuitry on a signal integrated circuit for acquiring and tracking valid P-code signals from at least one satellite of a GPS system; and a P-code channel used in the GPS receiver which is capable of simultaneously tracking P-code signals transmitted over L1 and L2 frequency bands, said channel comprising:

a single P-code clock generator for generating a first and a second clock signal, said first clock signal associated with the L1 frequency band and said second clock signal associated with the L2 frequency band, said first and second clock signals having the same frequency but different phases;

circuitry for generating a plurality of P-code chips and storing a plurality of the most recently generated of said P-code chips;

a first circuit for selecting a P-code from said stored plurality of P-code chips, said selected P-code being in phase with said first clock signal; and a second circuit for selecting a P-code from said stored plurality of P-code chips, said selected P-code being in phase with said second clock signal.

8. The apparatus of claim 7 and further comprising a P-code circular buffer within said generating and storing circuitry for storing two phases of P-code to track the L1 and L2 frequency bands separately.

9. The apparatus of claim 8 wherein said channel is configured to independently track the L1 or L2 frequency bands.

10. The apparatus of claim 7 and further comprising circuit for simultaneously generating C/A-code for the L1 frequency band, P-code for the L1 frequency band, and P-code for L2 frequency band.

11. The apparatus of claim 10 and further comprising circuitry for vector summing said C/A-code for the L1 frequency band, P-code for the L1 frequency band, and P-code for the L2 frequency band to increase sensitivity of said channel.

12. The apparatus of claim 7 and further comprising circuitry for continuous ionospheric correction within said channel.

13. A receiver for determining geographical position, velocity, and time from analog signal information received from a plurality of navigational satellites, the signal information having data shifts dependent upon distance and frequency shifts dependent upon the relative velocity between the satellite's transmission position and the geographical position of the receiver, wherein the analog signal is significantly weaker than ambient atmospheric noise, said receiver comprising:

a digital signal processing circuit for acquiring the analog signal in the presence of the noise, estimating the current position, and for correcting said estimate based upon data exchanged between said digital signal processing circuit and a processor; and a P-code channel coupled to said digital signal processing circuit for use in the receiver, said channel capable of simultaneously tracking the analog signal information carried over L1 and L2 frequency bands and comprising:

a single P-code clock generator for generating a first and a second clock signal, said first clock signal associated with L1 and said second clock signal associated with the L2 frequency band, said first and second clock signals having the same frequency but different phases;

circuitry for generating a plurality of P-code chips and storing a plurality of said P-code chips, said P-code chips being those most recently generated by said digital signal processing circuit;

a first circuit for selecting a P-code from said stored plurality of P-code chips, said selected P-code being in phase with said first clock signal; and a second circuit for selecting a P-code from said stored plurality of P-code chips, said selected P-code being in phase with said second clock signal.

14. The apparatus of claim 13 and further comprising a P-code circular buffer within said generating and storing circuitry for storing two phases of P-code to track the L1 and L2 frequency bands separately.

15. The apparatus of claim 14 wherein said channel is configured to independently track the L1 or L2 frequency bands.

16. The apparatus of claim 13 and further comprising circuit for simultaneously generating C/A-code for the L1 frequency band, P-code for the L1 frequency band, and P-code for the L2 frequency band.

17. The apparatus of claim 16 and further comprising circuitry for vector summing said C/A-code for L1 frequency band, P-code for the L1 frequency band, and P-code for the L2 frequency band to increase sensitivity of said channel.

18. The apparatus of claim 13 and further comprising circuitry for continuous ionospheric correction within said channel.

19. A method for simultaneously tracking signals carried over L1 and L2 frequency bands in a single P-code channel for use in a GPS receiver, said method comprising the steps of:

generating a first and a second clock signal using a single P-code clock generator, said first clock signal being associated with the L1 frequency band and said second clock signal being associated with the L2 frequency band, said first and second clock signals further having the same frequency but different phases;

generating a plurality of P-code chips;

storing a plurality of the most recently generated of said P-code chips;

selecting a P-code from said stored plurality of P-code chips in phase with said first clock signal; and selecting a P-code from said stored plurality of P-code chips in phase with said second clock signal.

20. The method of claim 19 and further comprising the step of tracking L1 in said channel to assist in L2 frequency band tracking.

21. The method of claim 19 and further comprising the step of tracking L2 in said channel to assist in L1 frequency band tracking.

22. The method of claim 19 and further comprising the step of independently tracking the L1 and L2 frequency bands.

23. The method of claim 19 and further comprising the step of simultaneously generating C/A-code for L1, P-code for the L1 frequency band, and P-code for the L2 frequency band within said channel.

24. The method of claim 23 and further comprising the step of vector summing said C/A-code for the L1 frequency band, P-code for the L1 frequency band, and P-code for the L2 frequency band.

25. The method of claim 19 and further comprising circuitry for continuous ionospheric correction within said channel.

26. A method for determining geographical position, velocity, and time from analog signal information received from a plurality of navigational satellites, the signal information having data shifts dependent upon distance and frequency shifts dependent upon the relative velocity between the satellite's transmission position and the geographical position of the receiver, wherein the analog signal is significantly weaker than ambient atmospheric noise, said method comprising the steps of:

acquiring the analog signal in the presence of the noise, estimating the current position, and correcting said estimate; and simultaneously tracking the analog signal information carried over L1 and L2 frequency bands in a single P-code channel, said tracking step comprising the steps of:

generating a first and a second clock signal using a single P-code clock generator, said first clock signal being associated with the L1 frequency band and said second clock signal being associated with the L2 frequency band, said first and second clock signals further having the same frequency but different phases;

generating a plurality of P-code chips;

storing a plurality of the most recently generated of said P-code chips;

selecting a P-code from said stored plurality of P-code being in phase with said first clock signal; and selecting a P-code from said stored plurality of P-code chips in phase with said second clock signal.

27. The method of claim 26 and further comprising the step of generating two phases of P-code for tracking the L1 and L2 frequency bands separately.

28. The method of claim 27 and further comprising the step of independently tracking the L1 or L2 frequency bands.

29. The method of claim 26 and further comprising the step of simultaneously generating C/A-code for the L1 frequency band, P-code for the L1 frequency band, and P-code for the L2 frequency band.

30. The method of claim 29 and further comprising the step of vector summing said C/A-code for the L1 frequency band, P-code for the L1, frequency band and P-code for the L2 frequency band to increase sensitivity of said channel.

31. The method of claim 26 and further comprising the step of continuously performing ionospheric corrections within said channel.

* * * * *